United States Patent
Molander

(10) Patent No.: US 7,792,200 B2
(45) Date of Patent: Sep. 7, 2010

(54) PEAK-TO-AVERAGE POWER REDUCTION

(75) Inventor: Mats Molander, Sollentuna (SE)

(73) Assignee: Telefonaltiebolaget LM Ericsson (publ), Stockholm (SE)

( * ) Notice: Subject to any disclaimer, the term of this patent is extended or adjusted under 35 U.S.C. 154(b) by 930 days.

(21) Appl. No.: 11/598,228

(22) Filed: Nov. 13, 2006

(65) Prior Publication Data
US 2007/0116142 A1    May 24, 2007

Related U.S. Application Data

(60) Provisional application No. 60/735,836, filed on Nov. 14, 2005.

(51) Int. Cl.
*H04L 27/28* (2006.01)
(52) U.S. Cl. .................................. 375/260; 375/296
(58) Field of Classification Search .................. 375/260, 375/295, 296
See application file for complete search history.

(56) References Cited

U.S. PATENT DOCUMENTS

| | | | |
|---|---|---|---|
| 6,314,146 B1 | 11/2001 | Tellado et al. | |
| 6,424,681 B1 | 7/2002 | Tellado et al. | |
| 6,512,797 B1 | 1/2003 | Tellado et al. | |
| 6,928,084 B2 | 8/2005 | Cimini, Jr. et al. | |
| 7,542,517 B2 * | 6/2009 | Kroeger | 375/296 |
| 2004/0028146 A1 | 2/2004 | Winkler | |
| 2004/0162097 A1 | 8/2004 | Vijayan et al. | |
| 2004/0218689 A1 | 11/2004 | Akhtman | |
| 2005/0100108 A1 * | 5/2005 | Yun et al. | 375/260 |
| 2005/0254587 A1 * | 11/2005 | Kim et al. | 375/260 |

OTHER PUBLICATIONS

International Search Report and Written Opinion mailed May 21, 2007, 10 pages.
Seung Hee Han et al., "An Overview of Peak-to-Average Power Ratio Reduction Techniques for Multicarrier Transmission", IEEE Wireless Communications, Apr. 2005, pp. 56-65.
Jose Tellado-Mourelo, "Peak to Average Power Reduction for Multicarrier Modulation", Dissertation for Stanford University; Sep. 1999, pp. 79-86.
U.S. Appl. No. 11/594,252, filed Nov. 8, 2006; Inventor: Molander.

* cited by examiner

*Primary Examiner*—Chieh M Fan
*Assistant Examiner*—David Huang
(74) *Attorney, Agent, or Firm*—Nixon & Vanderhye P.C.

(57) ABSTRACT

A multi-carrier transmitter and transmission technique are described for transmitting payload data during a transmission time interval with reduced peak-to-average power ratio (PAPR). A multi-carrier modulator modulates subcarrier frequencies with payload data and provides a modulated signal for transmission during the transmission time interval. Excessive peaks in the modulated signal are extracted. The extracted peaks signal is transformed into the frequency domain to generate a peaks frequency spectrum which is processed using the frequency spectrum of certain subcarriers selected for reducing PAPR to produce a peak compensation spectrum. In one approach, that spectrum is transformed into the time domain before being modified by the modulated signal in the time domain to reduce PAPR. Alternatively, that peak compensation spectrum is modified using a modulated frequency spectrum provided by the modulator in the frequency domain and the result is then transformed into the time domain to produce a modified modulated signal with reduced PAPR.

32 Claims, 14 Drawing Sheets

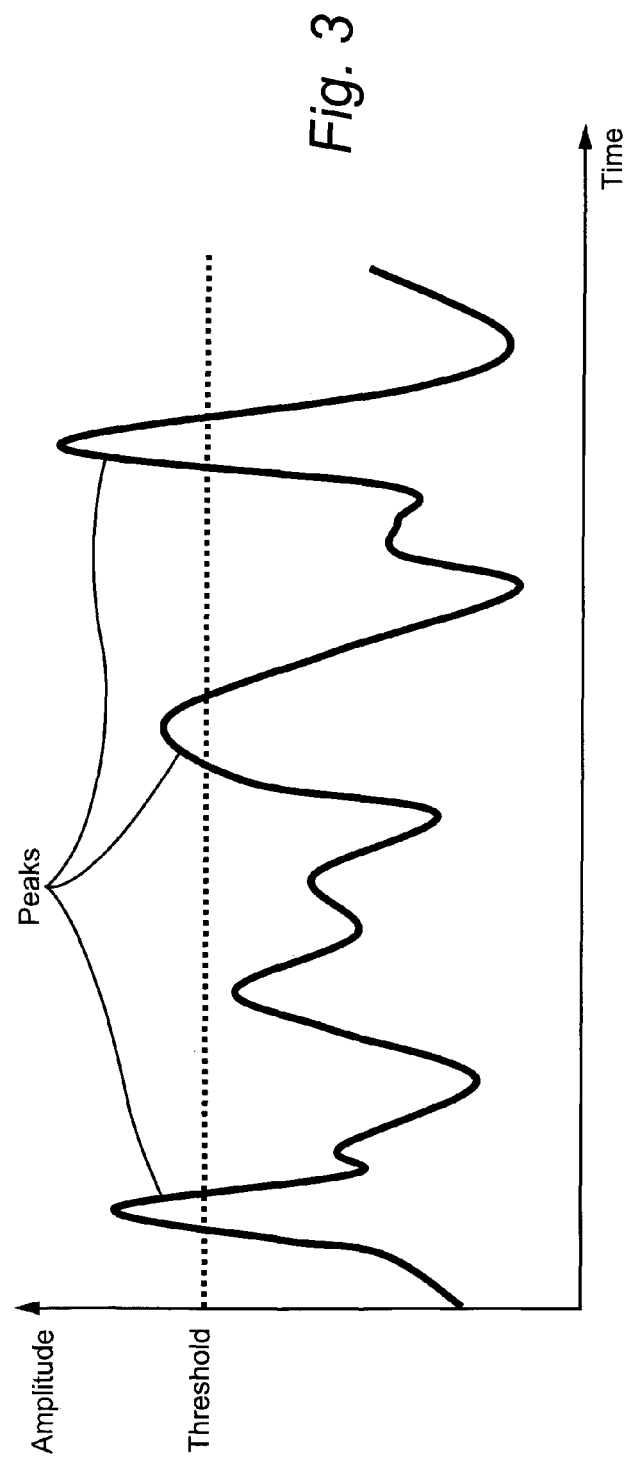

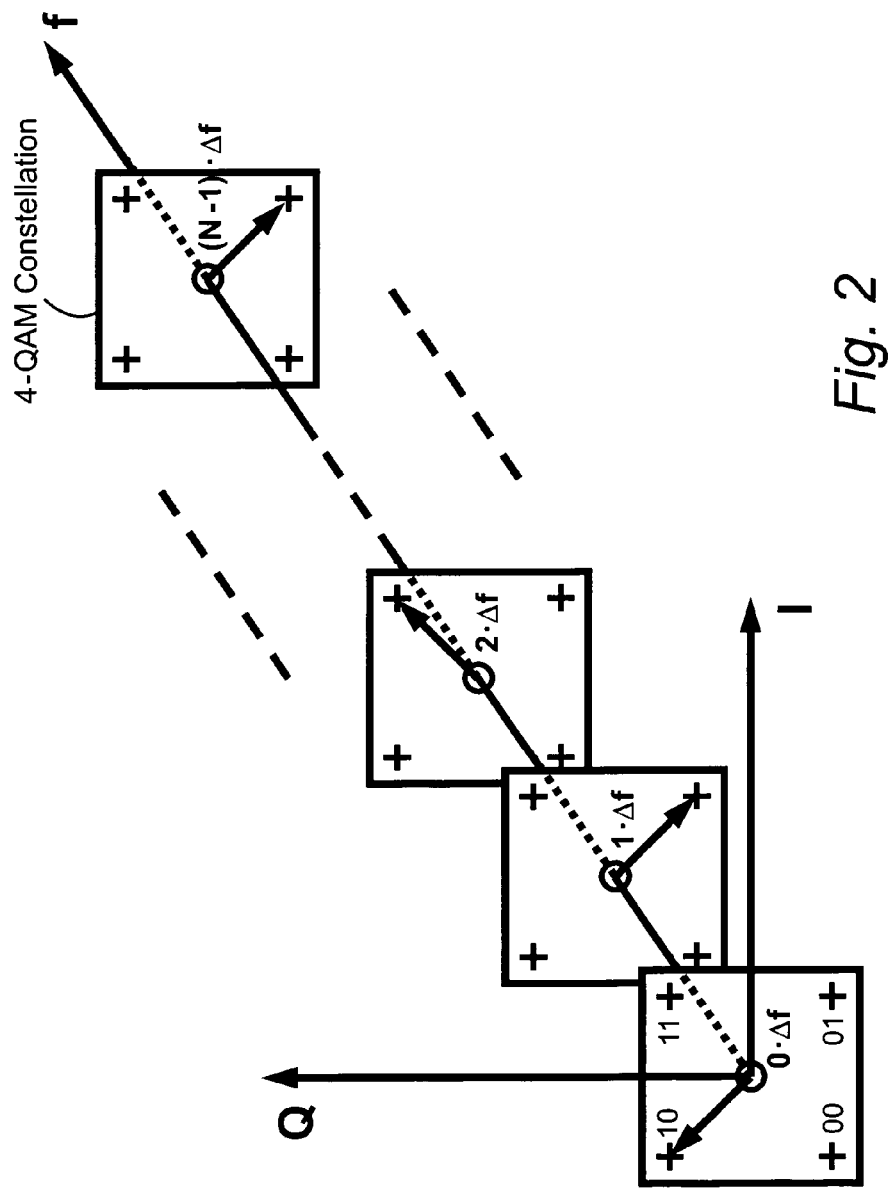

PEAK-TO-AVERAGE POWER REDUCTION

CROSS-REFERENCE TO RELATED APPLICATIONS

This application claims domestic priority from provisional application Ser. No. 60/735,836, filed Nov. 14, 2005, the disclosure of which is incorporated herein by reference. This application is also related to commonly assigned application Ser. No. 11/594,252, entitled "RF Power Distribution In the Frequency Domain," filed on Nov. 8, 2006.

TECHNICAL FIELD

The technical field relates to radio communications. The technology described relates to reducing peak-to-average power ratios in multi-carrier communication systems. One non-limiting example application is to Radio Frequency (RF) Power Amplifier (PA) applications where Orthogonal Frequency Division Multiplexing (OFDM) is employed, e.g., radio base stations and mobile stations in cellular radio networks.

BACKGROUND

Communication systems, whether they are used for transmitting analog or digital data, typically employ power amplifiers as part of the signal transmitter. For example, such power amplifiers are used in radio base station transmitters. Unfortunately, such power amplifiers have non-linear amplitude and phase transfer functions. If plotted, the power amplifier's output signal amplitude and phase as a function of the power amplifier's input amplitude would present non-linear curves over a considerable range of the input signal amplitude. For a strong signal with varying amplitude passing through the power amplifier, the non-linear amplitude and phase transfer functions cause distortions. These distortions pose a significant problem, since they cause a higher error vector magnitude (EVM) value of the transmitted signal, which in turn increases the bit error rate at the receiver of the transmitted data.

One way to avoid these non-linearity distortion effects for digital modulation signaling is to use constant envelope type signals, where only the phase is used to represent the data, but this has the drawback of generally providing only a low bit rate as compared to those types of modulation (such as quadrature amplitude modulation (QAM)) that also employ variations in amplitude to represent the data. Consequently, if a higher bit rate of a non-constant amplitude signal modulation scheme is to be obtained, the non-linearities of the power amplifier must be dealt with.

In Orthogonal Frequency Division Multiplexing (OFDM), the information to transmit is modulated onto a large number of equi-distant subcarriers, also referred to as tones. FIG. 1 shows an OFDM frequency spectrum with the subcarrier frequencies $f_0 \ldots f_{N-1}$, where N is the total number of subcarriers spanning the available bandwidth. The use of equi-distant subcarriers minimizes interference between information carried by different subcarriers. Because a large number of subcarriers are added together in OFDM to obtain the modulated signal, all with different frequencies and with varying phase angles, amplitude variations occur in the time domain. The interference between these subcarriers, regardless of their modulation schemes, causes peaks and troughs in the time domain of the amplitude of the modulated signal. And as explained above, the non-linearities of the power amplifier are a problem, since they cause a higher error vector magnitude (EVM) value, which in turn increases the bit error rate at the receiver of the transmitted data.

FIG. 2 illustrates in a conceptual way the OFDM modulation principle in which each OFDM symbol is represented in the frequency domain as a complex plane constellation centered at its subcarrier frequency. Consecutive OFDM symbols are separated by a frequency distance $\Delta f$. In this example, 4-QAM is used, where each symbol represents two bits, with the four possible value combinations 00, 01, 10, and 11. Each modulating symbol can be understood as a complex-valued vector in the complex symbol plane, having a real (I) and an imaginary (Q) component. Such a vector can alternatively be represented by the combination of its amplitude and its phase angle.

A frequency spectrum signal, like the one shown in FIG. 2, can be regarded as a frequency vector with as many components as there are subcarriers. Each component of the frequency vector is a complex value that represents the modulation of the corresponding subcarrier. An inverse Fourier transform is then performed on the frequency vector to produce a corresponding time vector, which comprises as many components as there are discrete points in time during the time of a symbol. Each component of the time vector is a complex value that represents the signal value at the corresponding point in time. Before transmission, this time-discrete, digital time domain signal is converted to a time-continuous, analog time domain signal.

FIG. 3 illustrates a continuous time domain representation of an example output signal envelope of a multi-carrier transmitter. The inverse Fourier transform in effect creates and adds the time vectors of all the modulated subcarriers into a single time vector. Unfortunately, when many subcarriers, all with different frequencies, are added to obtain the modulated signal, the interference between these frequencies causes in the time domain undesirable amplitude peaks in the modulated signal that produce undesirable distortion at the power amplifier output.

One brute force approach for reducing the effects of such distortions is to reduce the drive level into the amplifier ("backing off") so that the amplifier output power is considerably below saturation, where the magnitudes of the AM/AM, AM/PM, and IM distortions are tolerable. But this technique is not an option if the amplifier has to be backed off considerably in order to obtain acceptable distortion levels. Backing off the power amplifier tends to reduce the power conversion efficiency of the power amplifier. Additionally, for a given required transmitter output power, a power amplifier operated at a lower efficiency must be larger (and more expensive) than a power amplifier that can be operated at peak efficiency. Also, for a given output power, a lower-efficiency power amplifier requires a more costly power supply and cooling arrangement.

Another distortion compensation approach is to use linearizing circuitry, in which the linearizing can be, e.g., predistortion, Cartesian feedback, feed forward, or any other linearizing principle. For instance, a predistortion circuitry operates on a modulated signal to be amplified by distorting the modulated signal with a calculated inverse of the transfer function of the power amplifier. Both the amplitude and phase transfer functions can be predistorted. Thus, ideally, the predistortion and the power amplifier distortion cancel each other out in the hope of obtaining linear amplification between the input of the linearizing unit and the output of the RF power amplifier. However, the cost of linearizing can be decreased significantly if the peak-to-average power ratio (PAPR) of the signal to be processed can be lowered.

For multi-carrier modulation like OFDM, a high PAPR of an OFDM signal can be decreased using a subcarrier or "tone" reservation technique. Selected subcarriers, instead of carrying payload data, are reserved for PAPR reduction. The payload data is modulated only onto the non-reserved subcarriers. The hope is to assign to the selected subcarriers amplitude and phase values determined to offset the amplitude peaks produced by the payload subcarriers. But the difficulty is providing a practical and cost effective way of calculating suitable amplitude and phase values for the offsetting subcarriers. Although a peak-by-peak reduction in the time domain is possible, that approach requires multiple iterations to achieve satisfactory PAPR reduction.

SUMMARY

A multi-carrier transmitter and transmission technique are described for transmitting payload data during a transmission time interval with reduced peak-to-average power ratio (PAPR). A multi-carrier modulator modulates multiple subcarrier frequencies with payload data to be transmitted and provides a modulated signal for transmission during the transmission time interval. Peaks in the modulated signal to be reduced are extracted into an extracted peaks time signal. The extracted peaks time signal is transformed into the frequency domain to generate an extracted peaks spectrum which is processed using the spectrum of certain subcarriers selected for reducing PAPR to produce a peaks compensation spectrum.

In one example approach, that peaks compensation spectrum is transformed into the time domain before being combined with the modulated signal in the time domain in order to obtain a modified modulated signal with reduced PAPR. Alternatively, the peaks compensation spectrum may be combined in the frequency domain with a modulated spectrum provided by the modulator. The resulting spectrum for the modulated spectrum with reduced PAPR in the frequency domain is then transformed back into the time domain to produce a modified modulated signal with reduced PAPR. In either approach, the modified modulated signal is then converted from digital form into an analog signal, optionally translated to a higher frequency band, and amplified before being transmitted over a wireless or wired transmissions medium.

The subcarriers may be selected in any appropriate fashion. They may also optionally be re-selected as appropriate at any suitable time. For example, the selected subcarriers may be reserved subcarriers that are not scheduled to currently carry substantial payload information. Subcarrier-wise multiplying the peaks spectrum with the spectrum of just those selected subcarriers confines the peaks compensation spectrum to just the selected subcarrier frequencies, thereby avoiding interference with subcarriers carrying substantial payload data. Alternatively, the subcarriers selected may be those that currently have a signal quality condition below an appropriate preset threshold.

BRIEF DESCRIPTION OF THE DRAWINGS

FIG. 1 illustrates a frequency domain plot of several signals of a multi-carrier communications system;

FIG. 2 is a conceptual drawing that illustrates OFDM principles;

FIG. 3 is a graph of the amplitude of a multicarrier signal in the time domain with peaks that exceed an amplitude threshold;

DETAILED DESCRIPTION

The following description sets forth specific details, such as particular embodiments, procedures, techniques, etc. for purposes of explanation and not limitation. But it will be appreciated by one skilled in the art that other embodiments may be employed apart from these specific details. For example, although the following description is facilitated using non-limiting example applications to an OFDM transmitter, the technology may be employed by any type of multi-carrier transmitter that transmits over a wireless or wired transmissions medium. In some instances, detailed descriptions of well known methods, interfaces, circuits, and device are omitted so as not obscure the description with unnecessary detail. Moreover, individual blocks are shown in some of the figures. But multiple functions may be performed by one or more entities. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 4:
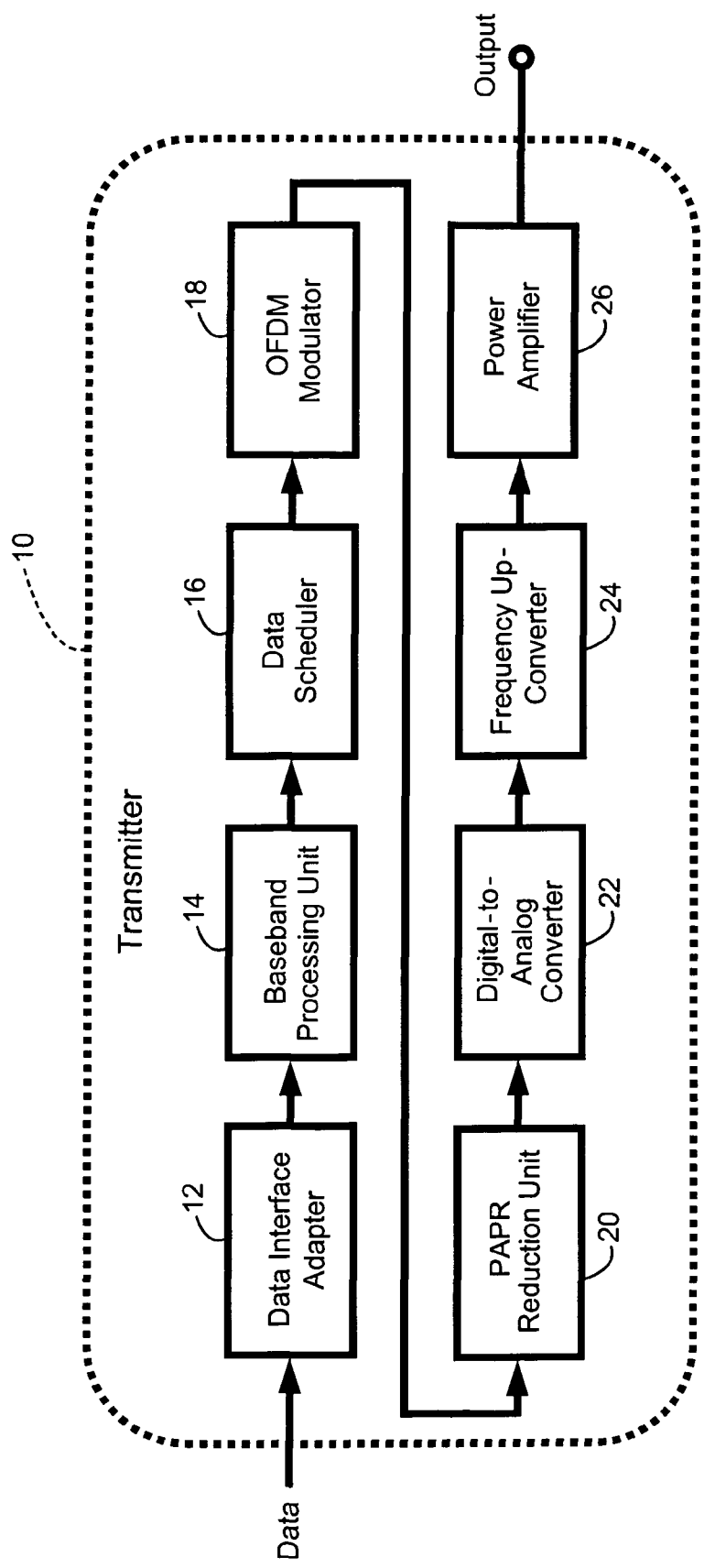
FIG. 4 is a function block diagram illustrating an example transmitter using OFDM modulation in which PAPR reduction is employed.

A non-limiting example transmitter 10 that employs PAPR reduction technology is shown in function block form in FIG. 4. A data interface adapter 12 receives data to be transmitted, converts the data to a format suitable for further processing, and passes the converted data to an optional baseband processing unit 14. The baseband processing unit 14 prepares the data for transmission by, for example, encrypting the data, block coding the data, interleaving the data, etc., and then forwards the prepared data to an optional data scheduler 16. The scheduler 16 may subdivide the baseband data into multiple blocks of data, where each block of data is to be transmitted at a particular power level during a transmission time interval. One non-limiting example of a data scheduler is described in commonly-assigned application Ser. No. 11/594,252, entitled "RF Power Distribution In the Frequency Domain," filed on Nov. 8, 2006.

The scheduled data are modulated in an OFDM modulator 18 or other multi-carrier modulator, and the modulated data are then processed in a peak-to-average power ratio (PAPR) reduction unit 20 to reduce the peak-to-average power ratio of the OFDM modulated signal. The PAPR reduction unit output is then converted into an analog signal in a digital-to-analog converter 22. An optional frequency up-converter 24 may translate the baseband signal to a higher frequency, e.g., radio frequency (RF), and provide the higher frequency signal to a power amplifier 26. The power amplifier 26 amplifies the signal and provides it to an output terminal for transmission over a suitable transmission medium, e.g., an antenna or modulated light source for wireless communications or a coaxial, twisted pair, fiber optic, or other cable for wired communications.

The transmitter 10 may be used in any suitable transmission application. One non-limiting example application is to a radio base station and/or a mobile station used in a cellular radio access network. The term "mobile station" is used generally in this case and encompasses any type of user equipment that can communicate over a wireless interface. Another non-limiting example is to an access point in a wireless local area network (WLAN).

Figure 5:
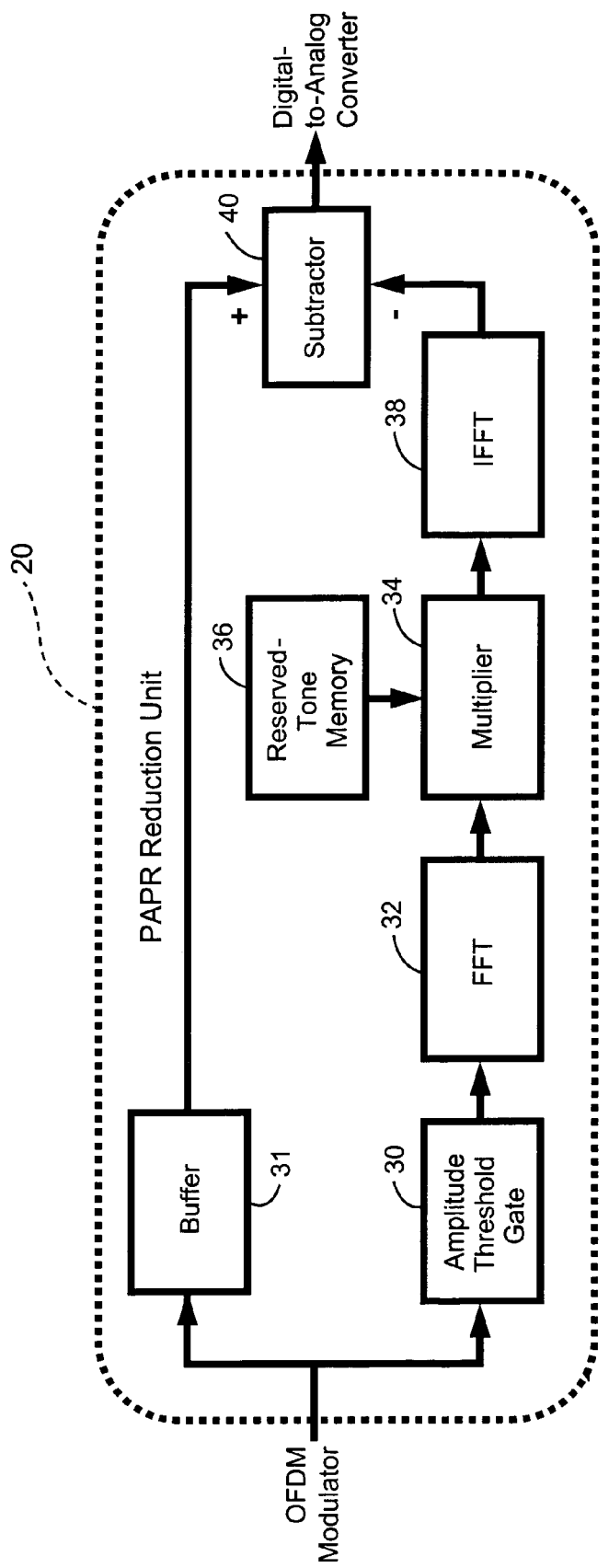
FIG. 5 is a function block diagram illustrating one non-limiting example of a PAPR reduction unit.

FIG. 5 is a function block diagram illustrating a non-limiting example of a peak-to-average power ratio (PAPR) reduction unit 20. The output signal from the OFDM modulator 18 to be transmitted in a next transmission time interval is a vector containing a time sequence of complex-valued samples which represent the OFDM-modulated data. This modulated signal is provided to both an amplitude threshold gate 30 as well as a buffer 31. The buffer stores or holds the modulated signal until the compensating signal has been generated. The amplitude threshold gate 30 identifies the peaks of the modulated signal which exceed a threshold value and extracts those peaks for further processing by copying them into the corresponding positions of an otherwise zeroed vector. The amplitude threshold gate 30 is just a non-limiting example and any other suitable extracting operation may be performed with the modulated signal in order to reduce PAPR.

Figure 10:
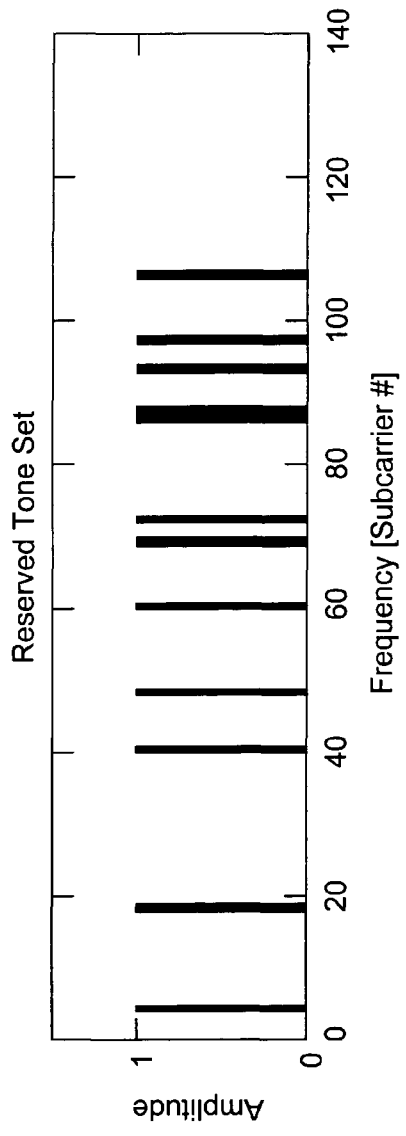
FIG. 10 is an amplitude versus frequency plot of a reserved tone set which is a non-limiting example of a selected set of subcarriers.

The extracted peaks signal is transformed into the frequency domain using the fast Fourier transform (FFT) 32 to provide a complex-valued extracted peaks spectrum. A reserved tone memory 36 stores a selected tones spectrum, an example of which is shown in FIG. 10 described below, that identifies selected subcarriers to be used for PAPR reduction. Each of the subcarriers in the extracted peaks spectrum is then subcarrier-wise multiplied by the corresponding subcarrier in the selected tone spectrum using a complex-valued multiplier 34 to obtain a peaks compensation spectrum. Subcarrier-wise multiplied means multiplied per subcarrier. For example, information associated with subcarrier number "x" in the extracted peaks spectrum is multiplied by the information associated with subcarrier number "x" in the selected tone spectrum. In this way, only the subcarriers in the extracted peaks spectrum which correspond to non-zero subcarriers in the selected tones spectrum will have non-zero values out from the multiplier 34. However, other processing techniques may be used to modify the extracted peaks spectrum using the selected tone spectrum.

The multiplier 34 provides the peaks compensation spectrum to an inverse fast Fourier transform (IFFT) 38 which converts that spectrum into the time domain to provide a peaks compensation signal. That peaks compensation signal is then subtracted in a subtractor 40 from the modulated signal, which is retrieved from the buffer 31, to generate a modulated signal with reduced peak-to-average power ratio (PAPR). The subtractor 40 is just an example and any other suitable combining operation may be performed with the peaks compensation signal and the modulated signal in order to reduce PAPR.

Figure 6:
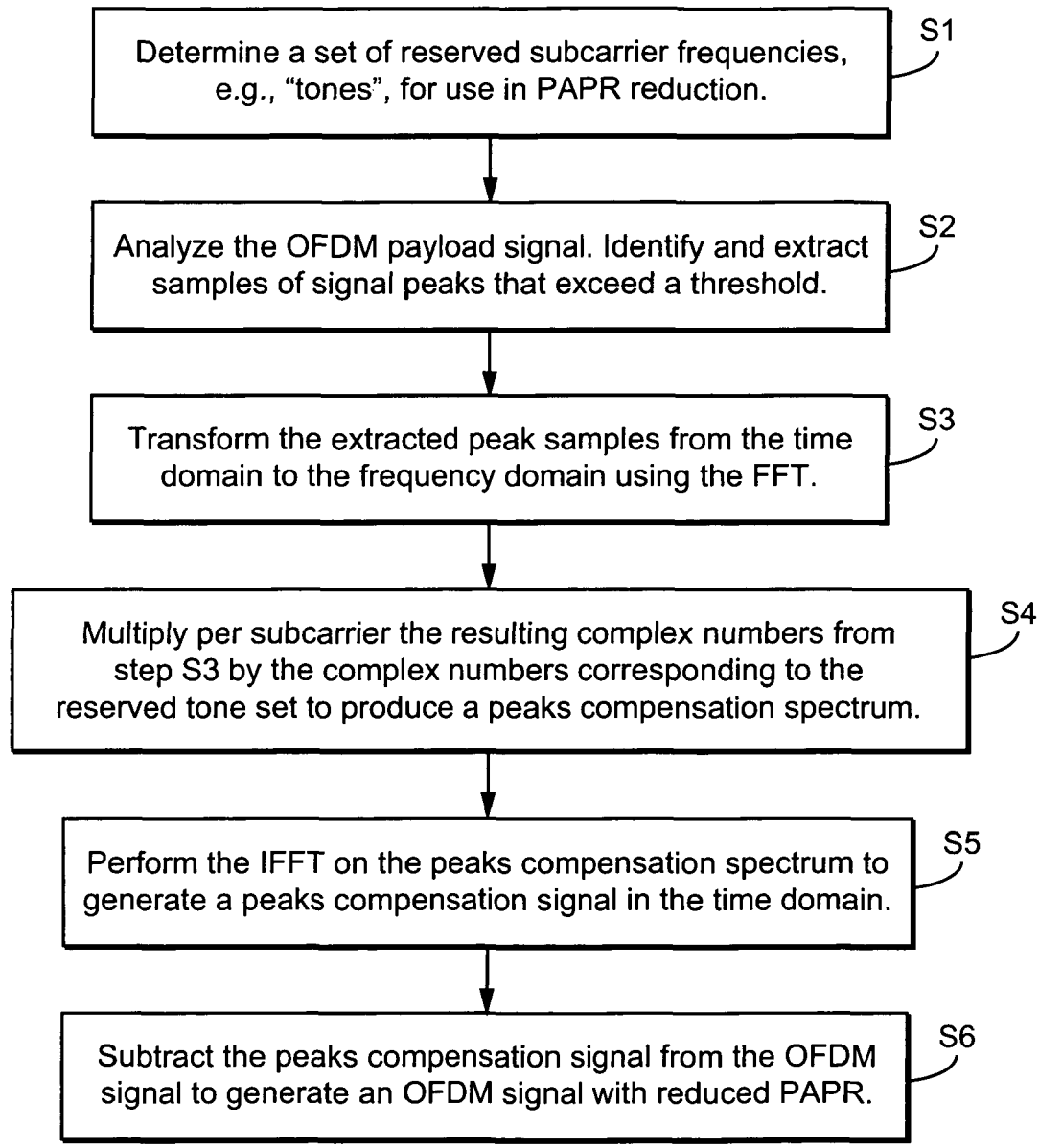
FIG. 6 is a flow chart illustrating non-limiting example procedures for PAPR reduction in accordance with the PAPR reduction unit shown in FIG. 5.

FIG. 6 is a flow chart diagram illustrating non-limiting example procedures for PAPR reduction in accordance with the PAPR reduction unit 20 shown in FIG. 5. Initially, a set of subcarrier frequencies or tones is selected for use in PAPR reduction (step S1). For example, a certain percentage of subcarriers could be reserved for use in PAPR reduction as a reserved tone set. The selected subcarriers may or may not be evenly-spaced across the allocated frequency bandwidth, but preferably they are not evenly-spaced.

Once the tone set is selected, it may remain static and be used for multiple PAPR reduction operations. Alternatively, the selected tone set could be changeable or dynamic, but at the cost of increased complexity. For example, the signal quality on each of the subcarrier frequencies could be monitored at the receiver end, and those subcarrier frequencies currently having a poor signal quality, and therefore being less able to satisfactorily convey substantial payload information, could be selected as the PAPR reduction subcarriers. However, this may not produce a reserved set with good peak-to-average ratio-reducing properties. Since the signal quality conditions of channels often vary, (and in a radio communications context, conditions often vary quite rapidly), selected subcarriers need to be updated as the channel conditions change. Although not necessary, it may be desirable to store information that identifies the selected subcarrier frequencies for use in PAPR reduction in an appropriate memory.

The OFDM payload signal, distributed onto the non-reserved subcarriers, is then analyzed in step S2 to identify and extract samples of signal peaks that exceed a threshold level. The extracted peaks signal samples are transformed from the time domain into the frequency domain using the fast Fourier transform (FFT) (step S3). The resulting complex values from step S3 are processed, e.g., subcarrier-wise multiplied, in the frequency domain using the corresponding complex values of the reserved tone set to produce a peaks compensation spectrum (step S4). In this way, only the subcarriers in the extracted peaks spectrum which correspond to non-zero subcarriers in the selected tone spectrum will have non-zero values in the peaks compensation spectrum. Then, the inverse fast Fourier transform (IFFT) is performed on the peaks compensation spectrum to generate a peaks compensation signal in the time domain (step S5). The peaks compensation signal is subtracted from the OFDM payload signal to generate an OFDM signal with reduced peak-to-average power ratio (PAPR) (step S6).

Figure 7:
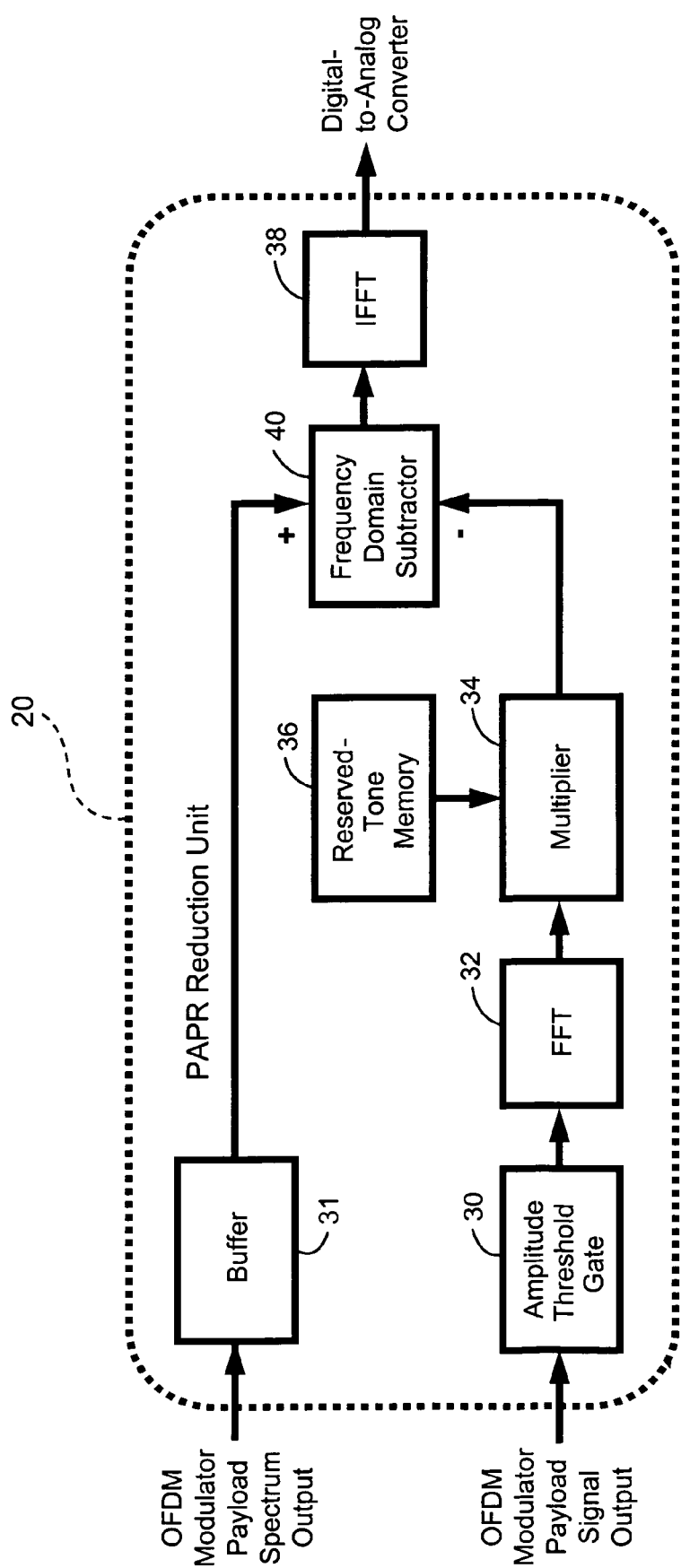
FIG. 7 is a function block diagram illustrating another non-limiting example of a PAPR reduction unit.

FIG. 7 illustrates a function block diagram for another non-limiting example of a PAPR reduction unit 20. Although similar to the PAPR reduction unit shown in FIG. 5, the PAPR reduction unit in FIG. 7 performs the peaks compensation in the frequency domain, using a frequency domain subtraction unit 40. In this case the OFDM modulator 18 outputs not only the modulated payload signal, but also the corresponding modulated payload spectrum, obtained e.g., before an IFFT (not shown) usually situated at the modulated signal output of the OFDM modulator 18, although other embodiments are possible. The modulated spectrum is stored in buffer 31 before being provided to the frequency domain subtractor 40 at the appropriate time to be combined with the peaks compensating spectrum generated by the complex multiplier 34. The compensated modulated spectrum is transformed from the frequency domain into the time domain via the IFFT 38 to obtain a modulated payload signal with reduced peak-to-average power ratio (PAPR). The remaining operations performed on the modulated payload signal from the OFDM modulator 18 output in the amplitude threshold gate 30, FFT 32, and the frequency domain multiplier 34 as described with respect to FIG. 5 are largely the same.

Figure 8:
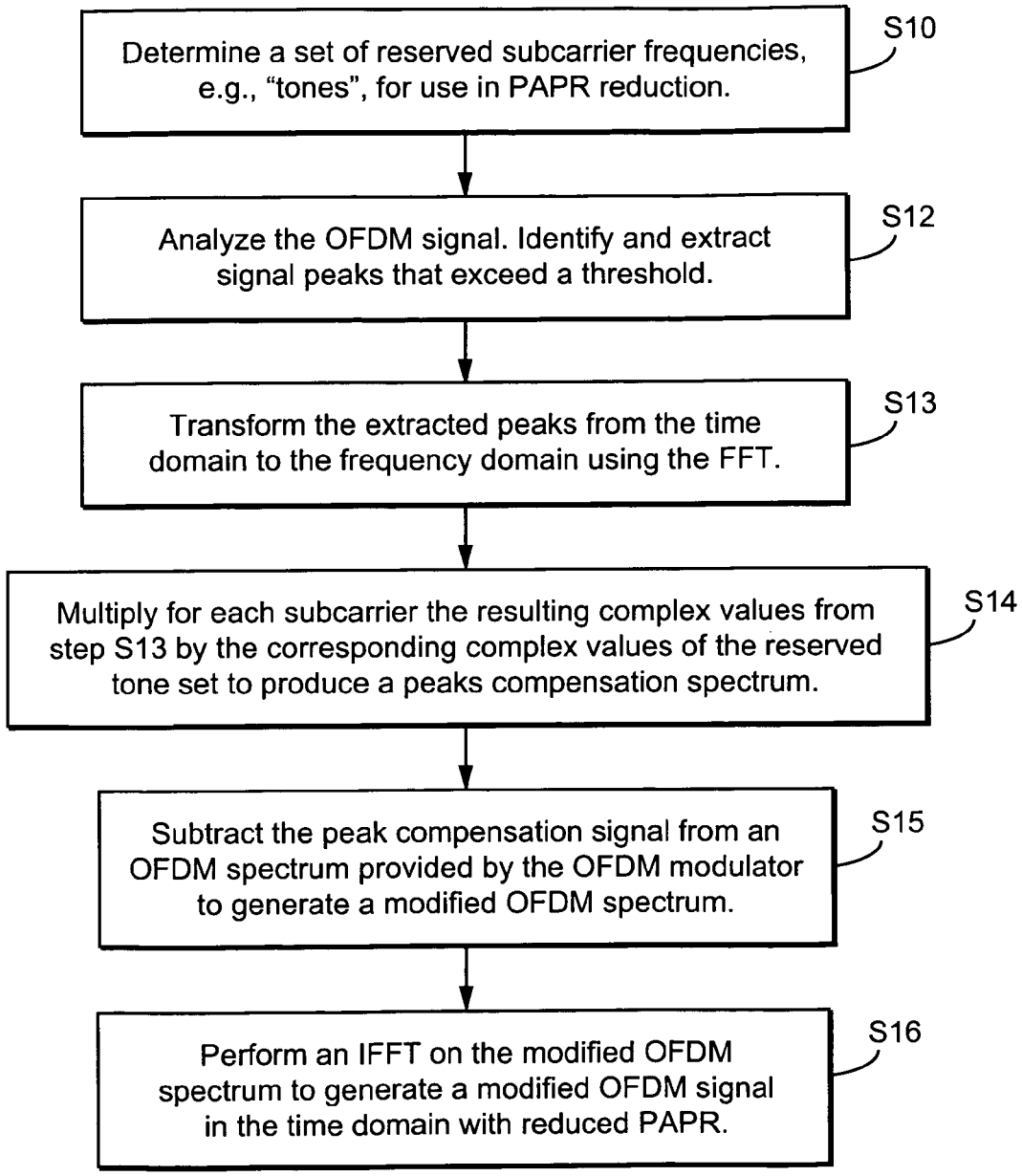
FIG. 8 is a flow chart illustrating non-limiting example procedures for PAPR reduction in accordance with the PAPR reduction unit shown in FIG. 7.

FIG. 8 is a flowchart diagram illustrating non-limiting example procedures for PAPR reduction in accordance with the PAPR reduction unit 20 shown in FIG. 7. Initially, a set of subcarrier frequencies or tones are selected for use in PAPR reduction (step S11). The OFDM payload signal is adjusted to fit onto the non-reserved subcarriers. The OFDM payload signal is analyzed in step S12 to identify and extract signal peaks that exceed a threshold level. The extracted peaks signal is transformed from the time domain into the frequency domain using the fast Fourier transform (FFT) (step S13). The resulting complex values from step S13 are subcarrier-wise multiplied by the corresponding complex values of the reserved tone set to produce a peaks compensation spectrum (step S14). The peaks compensation spectrum is subtracted from the OFDM payload spectrum provided by the OFDM modulator to generate a modified OFDM payload spectrum (step S15). An IFFT operation is then performed on the modified OFDM spectrum to generate a modified OFDM payload signal in the time domain with reduced PAPR (step S16).

Figure 9A:
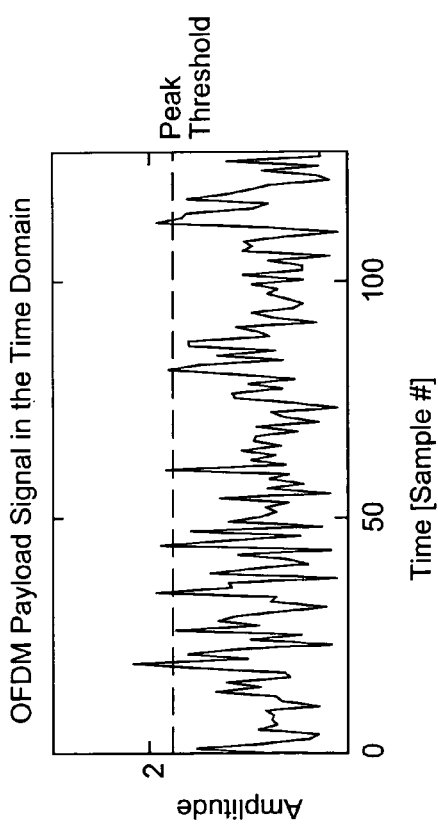
FIG. 9A is a graph of an OFDM signal in need of PAPR reduction.

The PAPR reduction technology is now further explained in the context of a non-limiting example. FIG. 9A is a graph of an OFDM payload signal in need of offsetting several amplitude peaks in order to reduce the peak-to-average power ratio (PAPR) of that signal. Several of the signal peaks exceed the peak threshold and are extracted, e.g., using an amplitude threshold gating process.

Figure 9B:
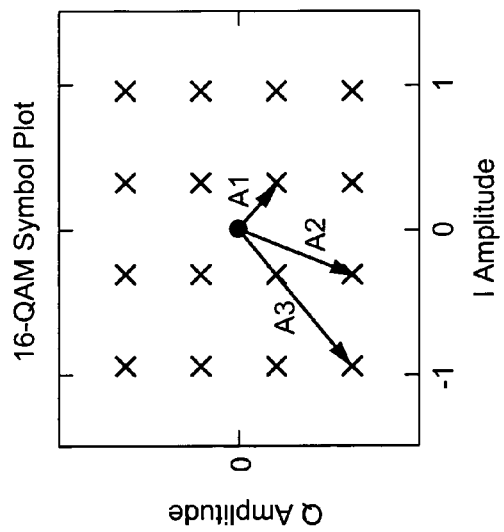
FIG. 9B is a symbol plot for 16-QAM type modulation.

The example OFDM payload signal in FIG. 9A is modulated using 16-QAM. FIG. 9B shows a 16-QAM symbol plot in which 16 different symbol constellation points are represented as "X's." Each symbol point can be viewed as a vector having an amplitude relative to the center origin point, shown as a black dot, and a phase angle relative to the I axis. As shown, there are three different possible vector amplitudes A1, A2, and A3.

Figure 9C:
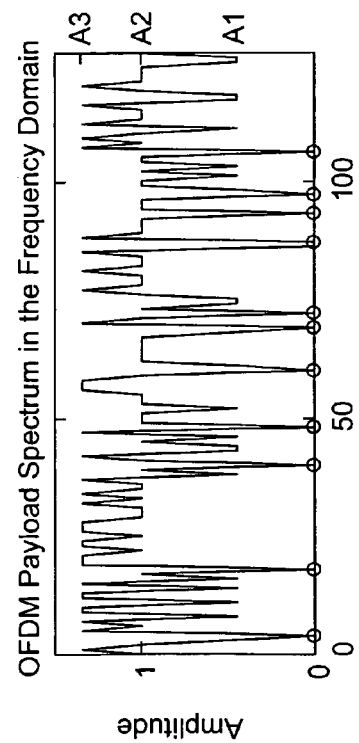
FIG. 9C is a graph of the corresponding OFDM signal transformed into the frequency domain.

FIG. 9C shows a graph of the OFDM payload signal in FIG. 9A transformed into an OFDM payload spectrum in the frequency domain. Each spectrum peak corresponds to one of the three different amplitudes A1, A2, and A3. Subcarriers having zero amplitude are identified with circles. These zero amplitude subcarriers correspond to the selected subcarriers to be used for PAPR reduction. They are reserved for PAPR reduction and are thus not available for symbol modulation.

FIG. 10 is a frequency plot of a reserved tone set corresponding to that shown in FIG. 9C. In other words, the original OFDM payload signal in the frequency domain is zero at all subcarrier frequencies where the reserved tones reside. Of course, if the reserved tone set changes (is dynamic), the payload data must also be rearranged accordingly.

Figure 11:
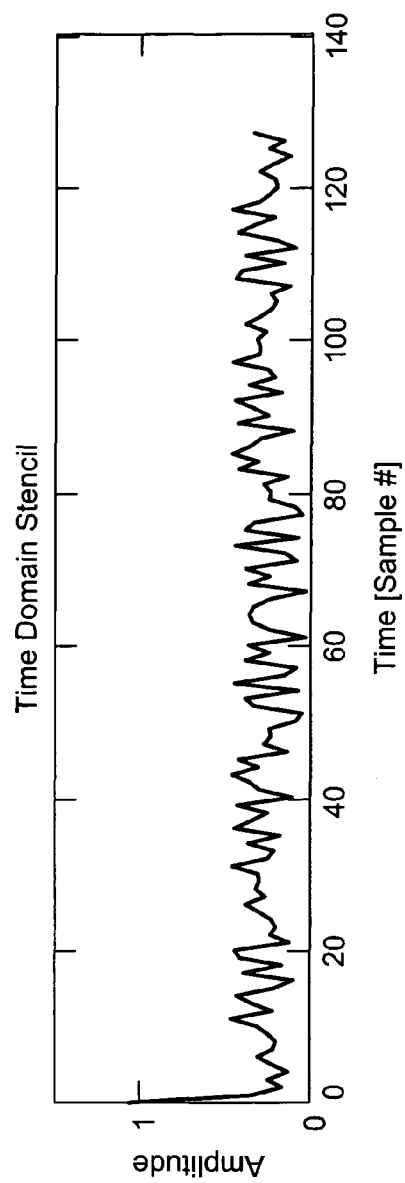
FIG. 11 is an amplitude versus time plot of a "stencil" resulting from Fourier transforming the reserved tone set in FIG. 10.

FIG. 11 is a graph of a time domain "stencil" resulting from a Fourier transform of the reserved tone set shown in FIG. 10. Notice the large amplitude at time sample #0. The rest of the stencil signal corresponds to "noise" occurring as a result of the inaccuracy in representing the single peak at sample #0 with only a subset of the subcarriers contributing. This noise affects the reserved tone set quality, which can be represented by the corresponding stencil's PAPR value, where a higher stencil PAPR value is better. This stencil PAPR value depends on how many and which reserved tones are selected.

Figure 12:
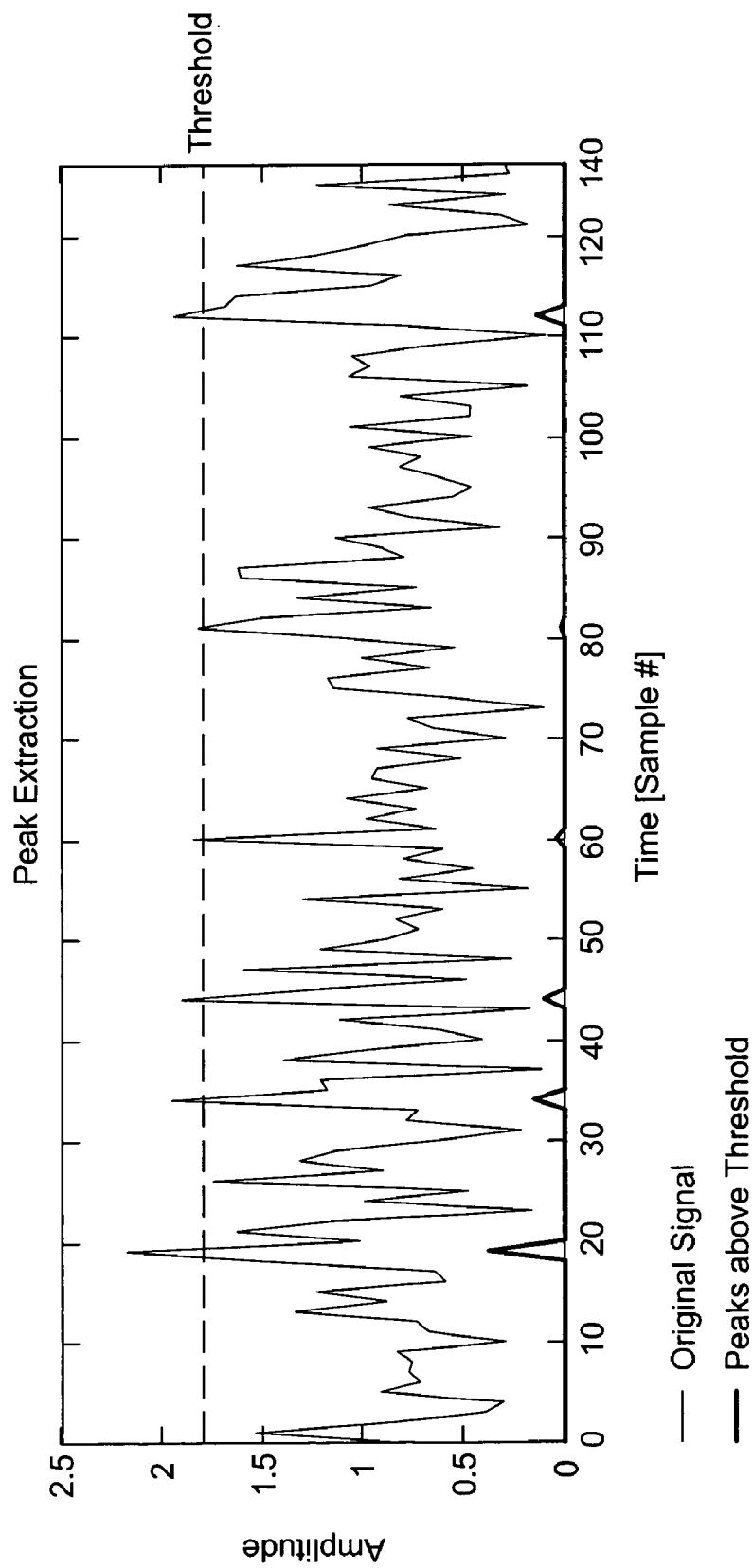
FIG. 12 graphs the example OFDM modulated payload signal in the time domain shown in FIG. 9A along with the signal peaks which are extracted since they exceed the threshold.

FIG. 12 graphs the amplitude of the example OFDM-modulated payload signal in the time domain taken from FIG. 9A along with the extracted peaks signal in which only the peaks which exceed the threshold level are non-zero. The peaks may be extracted by amplitude threshold gating of the time domain payload signal, or by some other technique. The extracted peaks signal is then converted into the frequency domain and subcarrier-wise multiplied by the reserved tone set in the frequency domain. The resulting peaks compensation spectrum obtained is transformed back into the time domain to provide a signal with reduced PAPR by subtraction from the OFDM payload signal.

Figure 13:
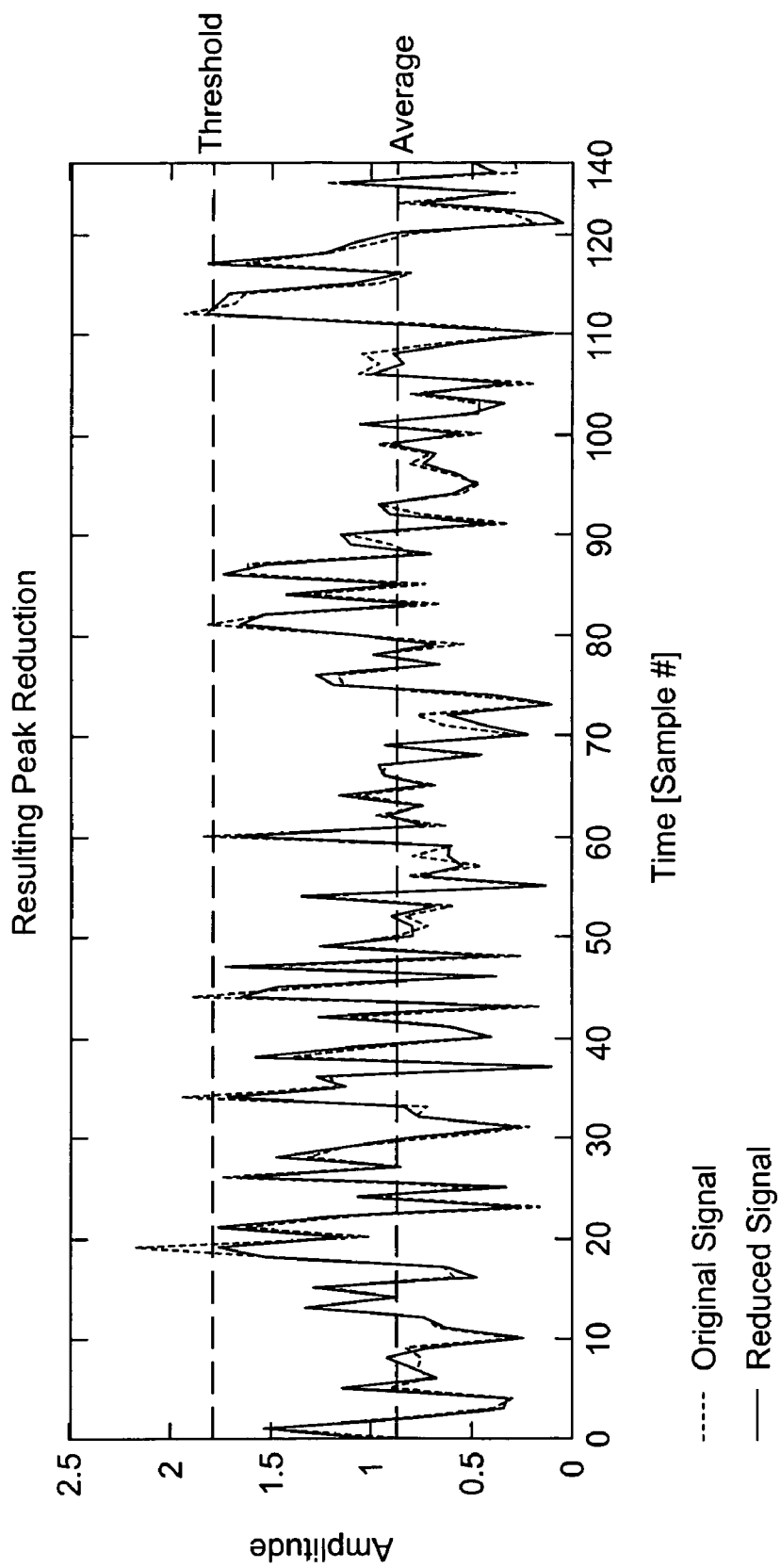
FIG. 13 is a graph that shows the significant reduction in peak levels using the PAPR reduction technology described in this application.

The actual peak reduction is illustrated in the graph of FIG. 13 in which the original signal and the reduced peaks signal are compared. The solid line represents the reduced peaks signal. Every peak was significantly reduced in amplitude, and nearly all the peaks were reduced below the threshold value.

Figure 14:
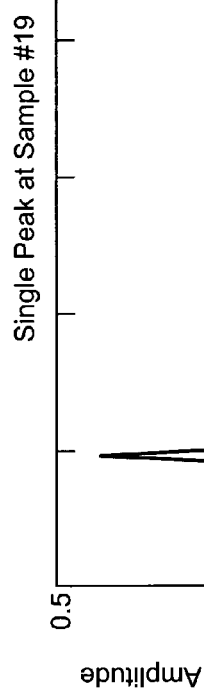
FIG. 14 is a graph of one example extracted signal peak in the time domain from the example payload OFDM modulated signal in FIG. 12.
Figure 15:
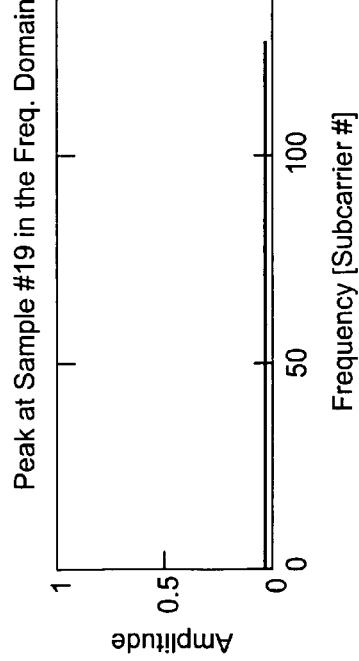
FIG. 15 is a graph of the constant amplitude spectrum corresponding to the single peak shown in FIG. 14.

In order to better understand how the suggested technology reduces PAPR, consider a signal in the time domain that contains a single peak at an arbitrary time position with an arbitrary amplitude and an arbitrary phase angle in the complex plane. For this purpose, one peak from the example OFDM modulated payload signal in FIG. 12, at time sample #19, is shown in FIG. 14; If a complex Fourier Transform operation is applied to that single-peak signal, then a complex single-peak spectrum is created in the frequency domain that precisely represents that peak. That single-peak spectrum is spread across the frequency domain as shown in FIG. 15 at a constant amplitude.

Figure 16:
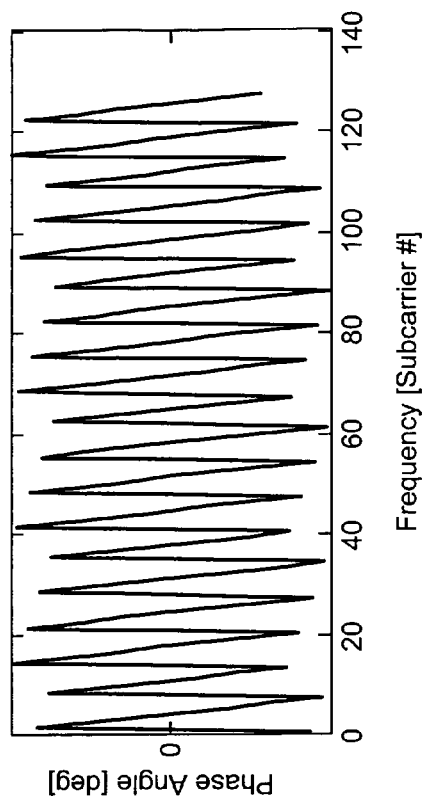
FIG. 16 is a graph showing the varying phase angle of the same frequency spectrum as in FIG. 15 corresponding to the single peak shown in FIG. 14.

But as FIG. 16 shows, the single-peak spectrum is in fact associated with a complex vector, having both a real component (bold line) and an imaginary component (thin line), that rotates in the complex plane at a particular, constant rate along the frequency axis in the frequency domain. That rate is directly related to and indicates the specific position of the single peak in the time domain. In this particular case, the phase-angle rotation rate of the real and imaginary sine waves shown in FIG. 16 encodes the peak at time position #19.

If a complex inverse Fourier transform operation is applied to that single-peak spectrum, then the original single-peak signal in the time domain is accurately recreated. The peak is in the original time position and with its amplitude and phase angle in the complex plane accurately recreated. The PAPR reduction technology takes advantage of these powerful properties of the Fourier and inverse Fourier transforms.

Indeed, if the complex Fourier transform operation is applied to a time signal containing multiple peaks at arbitrary but different positions, then the linearity of the Fourier transform and its inverse causes the corresponding complex multiple-peak spectrum to simultaneously accurately represent all those multiple peaks. If a complex inverse Fourier transform operation is subsequently applied to that multiple-peak spectrum, then the multiple-peak signal in the time domain is again accurately recreated, with the peaks in exactly their original positions and with their amplitudes and phases in the complex plane accurately recreated.

If that recreated extracted peaks signal is subtracted from the original signal without any further processing, then the peaks from the original OFDM payload signal are reduced to the threshold level. But the problem is that the spectrum of the compensation signal then interferes with the spectrum of the original OFDM payload signal and thus corrupts the payload data.

Figure 17:
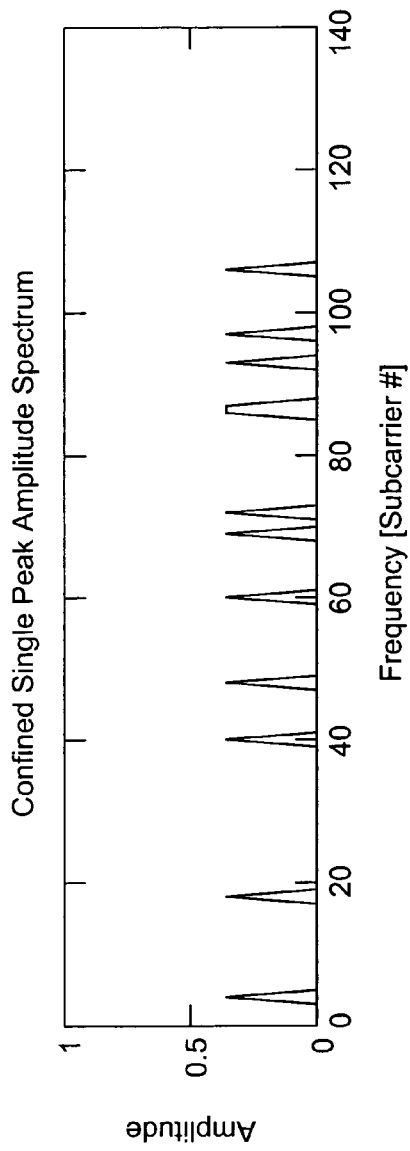
FIG. 17 is a graph that shows the amplitude of the product spectrum of subcarrier-wise multiplying the single-peak spectrum from FIG. 15 with the reserved tone set shown in FIG. 10.
Figure 18:
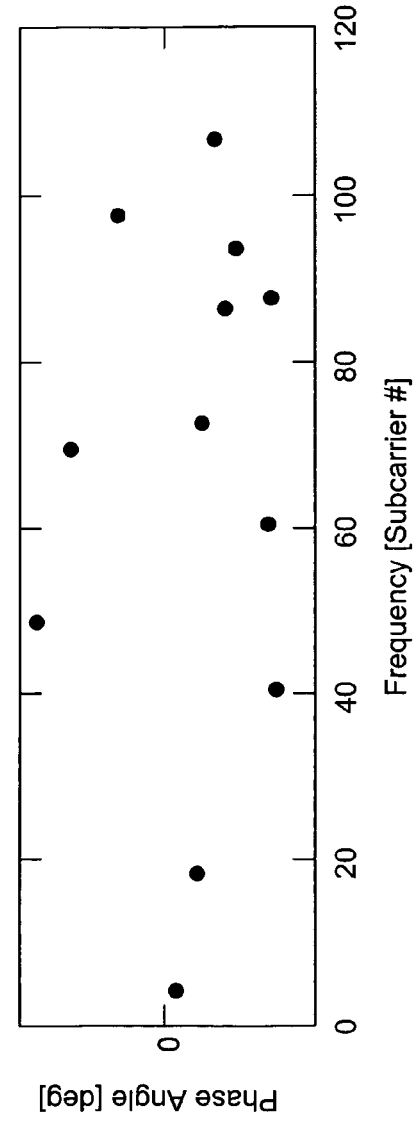
FIG. 18 is a graph that shows the phase angle of the same product spectrum as in FIG. 17.

In order to avoid such interference, the selected tone set can be confined to subcarriers which are not currently scheduled to carry substantial payload data. To obtain this, the extracted peaks spectrum is subcarrier-wise multiplied in the frequency domain by the selected tone set spectrum before it is transformed back into the time domain. Because the selected subcarriers spectrum has non-zero values for all selected subcarriers and a zero value for all other subcarriers, the subcarrier-wise multiplication in the frequency domain creates a peaks compensation spectrum where the only non-zero subcarriers are the ones which coincide with the selected tone set. Returning to our single-peak example, FIG. 17 shows the amplitude of the peaks compensation spectrum that results from subcarrier-wise multiplying the single-peak spectrum corresponding to peak #19 with the reserved tone set. Only the subcarriers at reserved positions are now non-zero. If only the amplitude spectrum is studied, it looks identical to the amplitude spectrum of the reserved tone set itself. But if the phase angles of the non-zero subcarriers are inspected, it can be seen that they vary over frequency, as is shown in FIG. 18. This variation encodes the position of the single peak as being at position #19.

Figure 19:
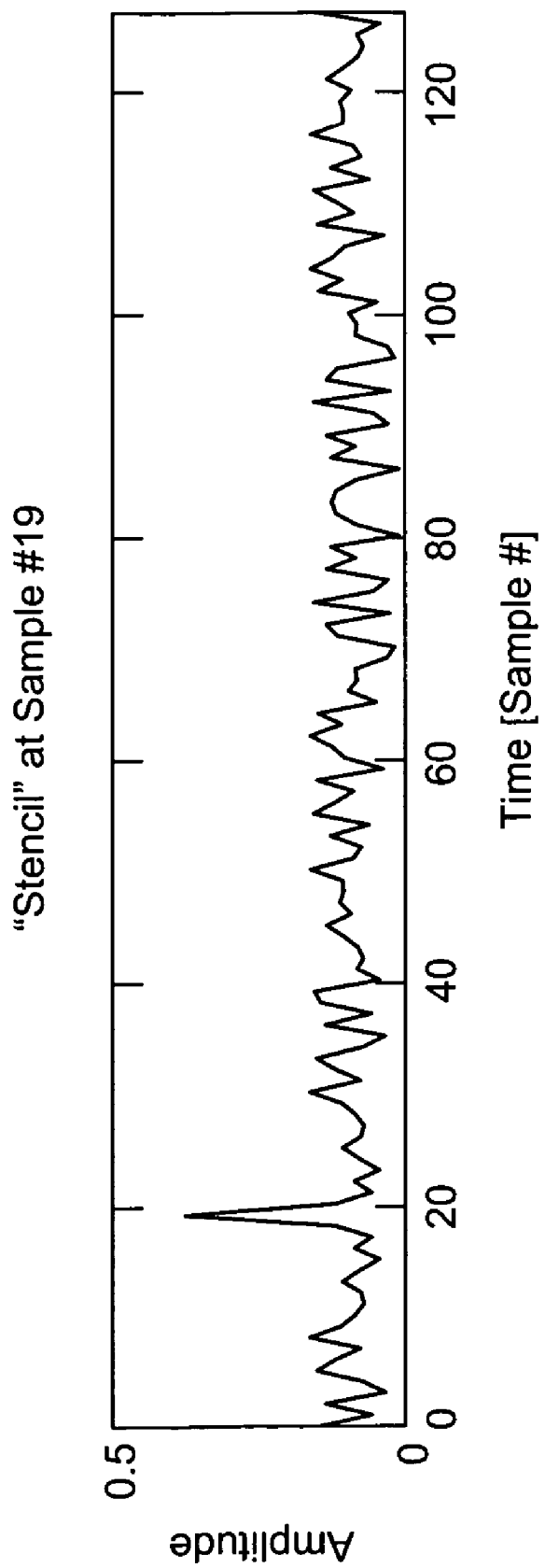
FIG. 19 is a graph showing the reduced peak along with some noise added by the PAPR reduction process.

FIG. 19 shows the result of an inverse Fourier transformation of the peaks compensation spectrum shown in FIG. 17 back into a time domain signal. However, the recreated single-peak signal is no longer the identical "clean" peak signal as in FIG. 14. Noise has been added. But that noise is an acceptable tradeoff because all the compensation signal power—including the noise—is confined to the selected subcarriers. As a result, the peak reduction does not adversely impact the original OFDM payload data. The waveform shown in FIG. 19 is the same as the waveform of the "stencil" shown in FIG. 11, but shifted in time to the position of the original peak #19 due to the phase angle constellation indicated in FIG. 18.

Yet another aspect of the PAPR reduction technology is now described. The subcarrier-wise multiplication in the frequency domain of the extracted peaks spectrum by the selected subcarriers spectrum corresponds in the time domain to a convolutional integral of the extracted peaks signal by the stencil function of the reserved tone set. The stencil function is the inverse Fourier transformation of the reserved tone set. An example of the stencil function is shown in FIG. 11. The stencil's main peak is at sample #0. The convolutional integral can be visualized by regarding the entire stencil function in the time domain as a stencil or template that is sliding over the extracted peaks signal along the time axis in a wrap-around manner. At each sliding position where a peak in the extracted peaks signal corresponds to the stencil's main peak, a copy of the stencil's entire time function is added in that position to the resulting peaks compensation signal. The amplitude and phase angle of the peak in the extracted peaks signal determines the amplitude and phase angle of the added stencil function copy. The accumulated result of this convolutional integral operation is the peaks compensation signal, which is then subtracted from the original OFDM payload signal in order to reduce its PAPR. Although this can be done on a peak-by-peak basis as described above, it can also be performed on an all-at-once basis using the Fourier transform and its inverse.

The PAPR reduction technology permits higher output power and/or provides a lower bit error rate by decreasing EVM (Error Vector Magnitude) caused by distortion in the power amplifier. The PAPR reduction technology is also advantageous because it is performed in a single "turn", working on all peaks that need to be reduced at one time. Iterations could be performed, but they are not required.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A transmitter for transmitting payload data during a transmission time interval using multi-carrier transmission, where subcarriers are selected to be used for peak-to-average power ratio reduction, comprising:
    a multi-carrier modulator for modulating multiple subcarrier frequencies with payload data to be transmitted and providing a modulated signal for transmission during the transmission time interval;
    peak detection circuitry for detecting and extracting one or more peaks in the modulated signal to be reduced;
    Fourier transformation circuitry for performing a Fourier transform operation on the extracted one or more peaks to generate a peaks frequency spectrum;
    processing circuitry for processing the peaks frequency spectrum using the frequency spectrum of the selected subcarriers to produce a peaks compensation frequency spectrum;
    inverse Fourier transformation circuitry for performing an inverse Fourier transform operation on the peaks compensation frequency spectrum to generate a peaks compensation signal in the time domain;
    a compensation circuit for using the peaks compensation signal to modify the modulated signal to obtain a modified modulated signal with reduced peak-to-average power ratio;
    a digital-to-analog converter for converting the modified modulated signal with reduced peak-to-average power ratio into an analog signal; and
    a power amplifier for amplifying the analog signal and providing an output signal to be transmitted.

2. The transmitter in claim 1, wherein the selected subcarriers are subcarriers that currently have a signal quality condition below a preset threshold.

3. The transmitter in claim 1, wherein the selected subcarriers are reserved subcarriers that are not scheduled to currently carry payload information.

4. The transmitter in claim 3, wherein the processing circuitry is configured to multiply per subcarrier the peaks frequency spectrum by the frequency spectrum of the reserved subcarriers to confine the peaks compensation signal to the reserved subcarrier frequencies to avoid interfering with subcarriers carrying substantial payload data.

5. The transmitter in claim 1, further comprising:
a buffer for holding the modulated signal until the peaks compensation signal is ready to be combined with the modulated signal.

6. The transmitter in claim 1, wherein the transmitter is configured to transmit the output signal over a wireless or wired transmissions medium.

7. The transmitter in claim 1, further comprising:
a memory for storing information identifying the selected subcarriers to be used for peak-to-average power ratio reduction.

8. The transmitter in claim 1, wherein the compensation circuit is a subtraction circuit configured to subtract the peaks compensation signal from the modulated signal to obtain the modified modulated signal with reduced peak-to-average power ratio.

9. A transmitter for transmitting payload data during a transmission time interval using multi-carrier transmission, where certain subcarriers are selected to be used for peak-to-average power ratio reduction, comprising:
a multi-carrier modulator for modulating multiple subcarrier frequencies with payload data to be transmitted and providing a modulated signal in the time domain and a corresponding modulated spectrum in the frequency domain;
peak detection circuitry for detecting and extracting one or more peaks in the modulated signal to be reduced;
Fourier transformation circuitry for performing a Fourier transform operation on the extracted one or more peaks to generate a peaks frequency spectrum;
processing circuitry for processing the peaks frequency spectrum using the frequency spectrum of the selected subcarriers to produce a peaks compensation frequency spectrum;
a compensation circuit for using the peaks compensation frequency spectrum to modify the corresponding modulated spectrum to obtain a modified modulated spectrum with reduced peak-to-average power ratio;
inverse Fourier transformation circuitry for performing an inverse Fourier transform operation on the modified modulated spectrum to generate a modified modulated signal in the time domain with reduced peak-to-average power ratio;
a digital to analog converter for converting the modified modulated signal into an analog signal; and
a power amplifier for amplifying the analog signal and providing an output signal to be transmitted.

10. The transmitter in claim 9, wherein the selected subcarriers are subcarriers that currently have a signal quality condition below a preset threshold.

11. The transmitter in claim 9, wherein the selected subcarriers are reserved subcarriers that are not scheduled to currently carry substantial payload information.

12. The transmitter in claim 11, wherein the processing circuitry is configured to multiply per subcarrier the peaks frequency spectrum by the frequency spectrum of the reserved subcarriers to confine the peaks compensation signal to the reserved subcarrier frequencies to avoid interfering with subcarriers carrying payload data.

13. The transmitter in claim 9, further comprising:
a buffer for holding the modulated frequency spectrum until the peaks compensation frequency spectrum is ready to be combined with the modulated frequency spectrum.

14. The transmitter in claim 9, wherein the transmitter is configured to transmit the output signal over a wireless or wired transmissions medium.

15. The transmitter in claim 9, further comprising:
a memory for storing information identifying the selected subcarriers to be used for peak-to-average power ratio reduction.

16. The transmitter in claim 9, wherein the compensation circuit is a subtraction circuit configured to subtract the peaks compensation frequency spectrum from the corresponding modulated spectrum to obtain the modified modulated spectrum.

17. A method for transmitting payload data during a transmission time interval using multi-carrier transmission, where subcarriers are selected to be used for peak-to-average power ratio reduction, comprising:
modulating multiple subcarrier frequencies with payload data to be transmitted and providing a modulated signal for transmission during the transmission time interval;
detecting and extracting one or more peaks in the modulated signal to be reduced;
performing a Fourier transform operation on the extracted one or more peaks to generate a peaks frequency spectrum;
processing the peaks frequency spectrum using the frequency spectrum of the selected subcarriers to produce a peaks compensation frequency spectrum;
performing an inverse Fourier transform operation on the peaks compensation frequency spectrum to generate a peaks compensation signal in the time domain;
modifying the modulated signal using the peaks compensation signal to obtain a modified modulated signal with reduced peak-to-average power ratio;
converting the modified modulated signal with reduced peak-to-average power ratio from digital form into an analog signal; and
amplifying the analog signal and providing an output signal to be transmitted.

18. The method in claim 17, wherein the selected subcarriers are subcarriers that currently have a signal quality condition below a preset threshold.

19. The method in claim 17, wherein the selected subcarriers are reserved subcarriers that are not scheduled to currently carry payload information.

20. The method in claim 19, wherein the processing includes multiplying per subcarrier the peaks frequency spectrum by the frequency spectrum of the reserved subcarriers to confine the peaks compensation signal to the reserved subcarrier frequencies to avoid interfering with subcarriers carrying payload data.

21. The method in claim 17, further comprising:
buffering the modulated signal until the peaks compensation signal is ready to be combined with the modulated signal.

22. The method in claim 17, further comprising:
transmitting the output signal over a wireless or wired transmissions medium.

23. The method in claim 17, further comprising:
storing information identifying the selected subcarriers to be used for peak-to-average power ratio reduction.

24. The method in claim 17, wherein the modifying includes subtracting the peaks compensation signal from the modulated signal to obtain the modified modulated signal with reduced peak-to-average power ratio.

25. A method for transmitting payload data during a transmission time interval using multi-carrier transmission, where subcarriers are selected to be used for peak-to-average power ratio reduction, comprising:
modulating multiple subcarrier frequencies with payload data to be transmitted and providing a modulated signal in the time domain and a corresponding modulated spectrum in the frequency domain;

detecting and extracting one or more peaks in the modulated signal to be reduced;

performing a Fourier transform operation on the extracted one or more peaks to generate a peaks frequency spectrum;

processing the peaks frequency spectrum using the frequency spectrum of the selected subcarriers to produce a peaks compensation frequency spectrum;

modifying the corresponding modulated spectrum using the peaks compensation frequency spectrum to obtain a modified modulated spectrum;

performing an inverse Fourier transform operation on the modified modulated spectrum to generate a modified modulated signal in the time domain with reduced peak-to-average power ratio;

converting the modified modulated signal from digital form into an analog signal; and amplifying the analog signal and providing an output signal to be transmitted.

26. The method in claim 25, wherein the selected subcarriers are subcarriers that currently have a signal quality condition below a preset threshold.

27. The method in claim 25, wherein the selected subcarriers are reserved subcarriers that are not scheduled to currently carry payload information.

28. The method in claim 27, wherein the processing includes per subcarrier multiplying the peaks frequency spectrum by the frequency spectrum of the reserved subcarriers to confine the peaks compensation signal to the reserved subcarrier frequencies to avoid interfering with subcarriers carrying payload data.

29. The method in claim 25, further comprising:
buffering the modulated frequency spectrum until the peaks compensation frequency spectrum is ready to be combined with the modulated frequency spectrum.

30. The method in claim 25, further comprising:
transmitting the output signal over a wireless or wired transmissions medium.

31. The method in claim 25, further comprising:
storing information identifying the selected subcarriers to be used for peak-to-average power ratio reduction.

32. The method in claim 25, wherein the modifying includes subtracting the peaks compensation frequency spectrum from the corresponding modulated spectrum to obtain the modified modulated spectrum.

* * * * *

UNITED STATES PATENT AND TRADEMARK OFFICE
CERTIFICATE OF CORRECTION

| | | |
|---|---|---|
| PATENT NO. | : 7,792,200 B2 | Page 1 of 1 |
| APPLICATION NO. | : 11/598228 | |
| DATED | : September 7, 2010 | |
| INVENTOR(S) | : Molander | |

It is certified that error appears in the above-identified patent and that said Letters Patent is hereby corrected as shown below:

On the Title Page, in item (73), under "Assignee", in Column 1, Line 1, delete "Telefonaltiebolaget" and insert -- Telefonaktiebolaget --, therefor.

Column 11, Line 19, in Claim 9, after "where" delete "certain".

Signed and Sealed this
Twenty-fifth Day of January, 2011

David J. Kappos
*Director of the United States Patent and Trademark Office*